(12) United States Patent
Wadsworth

(10) Patent No.: US 10,882,441 B2
(45) Date of Patent: *Jan. 5, 2021

(54) SYSTEMS AND METHODS FOR SECURING CARGO ON A FLATBED CARRIER

(71) Applicant: Coilkeeper, LLC, Lincoln, AL (US)

(72) Inventor: Donald E. Wadsworth, Lincoln, AL (US)

(73) Assignee: Coilkeeper. LLC, Lincoln, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,613

(22) Filed: Oct. 31, 2018

(65) Prior Publication Data

US 2019/0232857 A1   Aug. 1, 2019

Related U.S. Application Data

(63) Continuation of application No. 14/808,516, filed on Jul. 24, 2015, now Pat. No. 10,144,336.

(51) Int. Cl.
*B60P 7/12* (2006.01)
(52) U.S. Cl.
CPC ..................... *B60P 7/12* (2013.01)
(58) Field of Classification Search
CPC ..... B60P 7/12; B61D 45/003; B62D 33/0207; B62D 33/0215
USPC .... 410/47, 49, 50, 36, 37, 41, 120, 97, 155; 211/23, 13.1, 60.1; 206/446
See application file for complete search history.

(56) References Cited

U.S. PATENT DOCUMENTS

| | | | |
|---|---|---|---|
| 2,411,900 A | 12/1946 | Seward |
| 2,851,235 A | 9/1958 | Seymour |
| 3,008,731 A | 11/1961 | Bombardier |
| 3,204,983 A | 9/1965 | Karl |
| 3,387,813 A | 6/1968 | Carino |
| 3,409,157 A | 11/1968 | Lull |
| 3,637,235 A | 1/1972 | Karlin |

(Continued)

FOREIGN PATENT DOCUMENTS

| | | |
|---|---|---|
| CA | 2915289 A1 | 6/2006 |
| DE | 1506439 A1 | 6/1969 |

(Continued)

OTHER PUBLICATIONS

"49 CFR 393.120—What are the rules for securing metal coils," US Law, Legal Information Institute, Sep. 27, 2002, https://www.law.cornell.edu/cfr/text/49/393.120, pp. 1-5.

*Primary Examiner* — Hilary L Gutman
(74) *Attorney, Agent, or Firm* — Maynard Cooper & Gale, P. C.; Jon E. Holland

(57) ABSTRACT

The cargo system secures at least one steel coil for transport on a flatbed carrier. Each coil sits on movable cargo supports coupled on top of a base with support beams. Support brackets couple the support beams to anchoring beams that are coupled to the flatbed carrier. Once a coil is loaded, arms with adjacent upper and lower segments connected by cross members pivot on arm mounts to make contact with the coil. The arms adjust by lengthening or shortening based on the size of the coil. Tethers pass through anchor brackets and over the coil to hold the coil to the base. The arms apply pressure to the coil based on the tension of tethers that extend from the ends of the arms and couple to tethering brackets coupled to the frame of the carrier.

8 Claims, 7 Drawing Sheets

(56) References Cited

U.S. PATENT DOCUMENTS

| | | |
|---|---|---|
| 3,807,759 A | 4/1974 | Vornberger |
| 3,922,004 A | 11/1975 | Chamberlain |
| 4,102,274 A | 7/1978 | Feary et al. |
| 4,365,919 A | 12/1982 | Mehki |
| 5,538,376 A | 7/1996 | Borda |
| 5,664,918 A | 9/1997 | Heider et al. |
| 5,836,605 A | 11/1998 | Bowling |
| 5,888,039 A | 3/1999 | Cooley |
| 5,954,465 A | 9/1999 | Ellerbush |
| 5,964,557 A | 10/1999 | Eng |
| 5,997,228 A | 12/1999 | Potter |
| 6,250,860 B1 | 6/2001 | Hornady |
| 6,896,457 B2 | 5/2005 | Halliar |
| 7,056,073 B2 | 6/2006 | Ardo |
| 7,270,507 B1 | 9/2007 | Jernigan |
| 7,311,483 B1 | 12/2007 | Nudo |
| 7,503,738 B1 | 3/2009 | Doyle |
| 8,057,143 B2 | 11/2011 | Adams |
| 8,272,819 B1 | 9/2012 | Adams |
| 10,144,336 B1 * | 12/2018 | Wadsworth ............... B60P 7/12 |
| 2002/0043816 A1 | 4/2002 | Johnston |
| 2003/0190209 A1 | 10/2003 | Smith |
| 2006/0013666 A1 | 1/2006 | Halliar |
| 2010/0329808 A1 | 12/2010 | Hazen |
| 2011/0027033 A1 | 2/2011 | Comeau |
| 2012/0128441 A1 | 5/2012 | Mcdaniel |
| 2019/0233163 A1 * | 8/2019 | Hamner ............... B61D 45/003 |

FOREIGN PATENT DOCUMENTS

| | | |
|---|---|---|
| DE | 3514975 A1 | 10/1986 |
| DE | 10312638 A1 | 10/2004 |
| EP | 1733955 A1 | 12/2006 |

* cited by examiner

SYSTEMS AND METHODS FOR SECURING CARGO ON A FLATBED CARRIER

CROSS REFERENCE TO RELATED APPLICATIONS

This application is a continuation of and claims priority to U.S. patent application Ser. No. 14/576,949, entitled "Systems and Methods for Securing Cargo on a Flatbed Carrier" and filed on Jul. 24, 2015, which is incorporated herein by reference.

RELATED ART

Conventional cargo securement systems prepare steel coils for transport on a flatbed carrier using a combination of parts such as wedges, timbers, chocks or bunks adjacent to the deck of the carrier to brace the cargo (i.e., prevent shifting, rolling or sliding), and tie downs such as straps, ropes or chains to physically anchor the cargo to the carrier. However, even when a combination of wooden timbers, coil bunks and chains is used as specified in the applicable regulations for securing large cylindrical metal coils, such device combinations and configurations are sometimes inadequate to secure various cargo during transit, such as heavy, difficult to secure steel coils. For example, it has been observed that in emergency situations, the coils may break free and shift, roll or slide and fall from the carrier. As a result, severe damage, injury or death may occur.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to systems and methods for securing cargo on a flatbed carrier. In one exemplary embodiment, the cargo system secures at least one steel coil for transport on a flatbed carrier. A base lies on the flatbed carrier and couples to the flatbed carrier so that the base does not move with respect to the flatbed carrier. Cargo supports (e.g., chocks or wedges) on the base lock into a position that will support a steel coil and brace it against movement during transport. Adjustable arms coupled to the base pivot toward the coil, pressing against upper portions of the coil to brace the coil for transport. Tethers extend from distal ends of each of the arms and couple to the carrier, holding tension between the arms and the carrier, so that the arms press against the coil and secure the coil to the carrier. Using such techniques, the system can secure steel coils for transport on a flatbed carrier and reduce the likelihood that a coil will break free from the carrier during transit.

Figure 1:
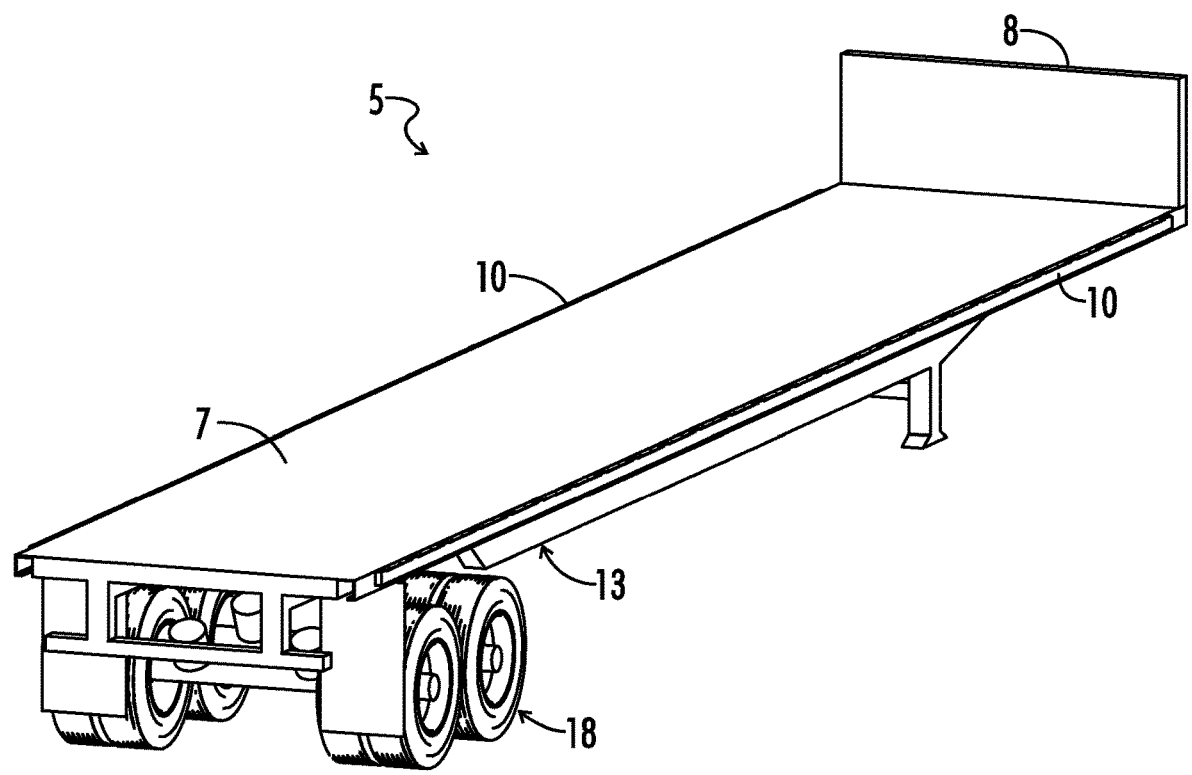
FIG. 1 is a three-dimensional perspective view illustrating a flatbed carrier.

FIG. 1 depicts a flatbed carrier 5. The carrier 5 shown in FIG. 1 is a conventional flatbed trailer 5 to be connected to and pulled by a vehicle, such as an 18 wheeler truck, but in other embodiments, other flatbed carriers 5 (such as flatbed rail cars for transport by train) are possible. The carrier 5 shown in FIG. 1 has a generally flat deck 7, a stop rail 8 and parallel side rails 10 separated from the deck 7 by spaces that roughly form slots (not specifically shown in FIG. 1) between the side rails 10 and the deck 7. The carrier 5 also has a mainframe 13 that provides support to its deck 7 and couples to a rear wheel and axle system 18 so that a tractor (not shown) can tow the carrier 5.

Figure 2:
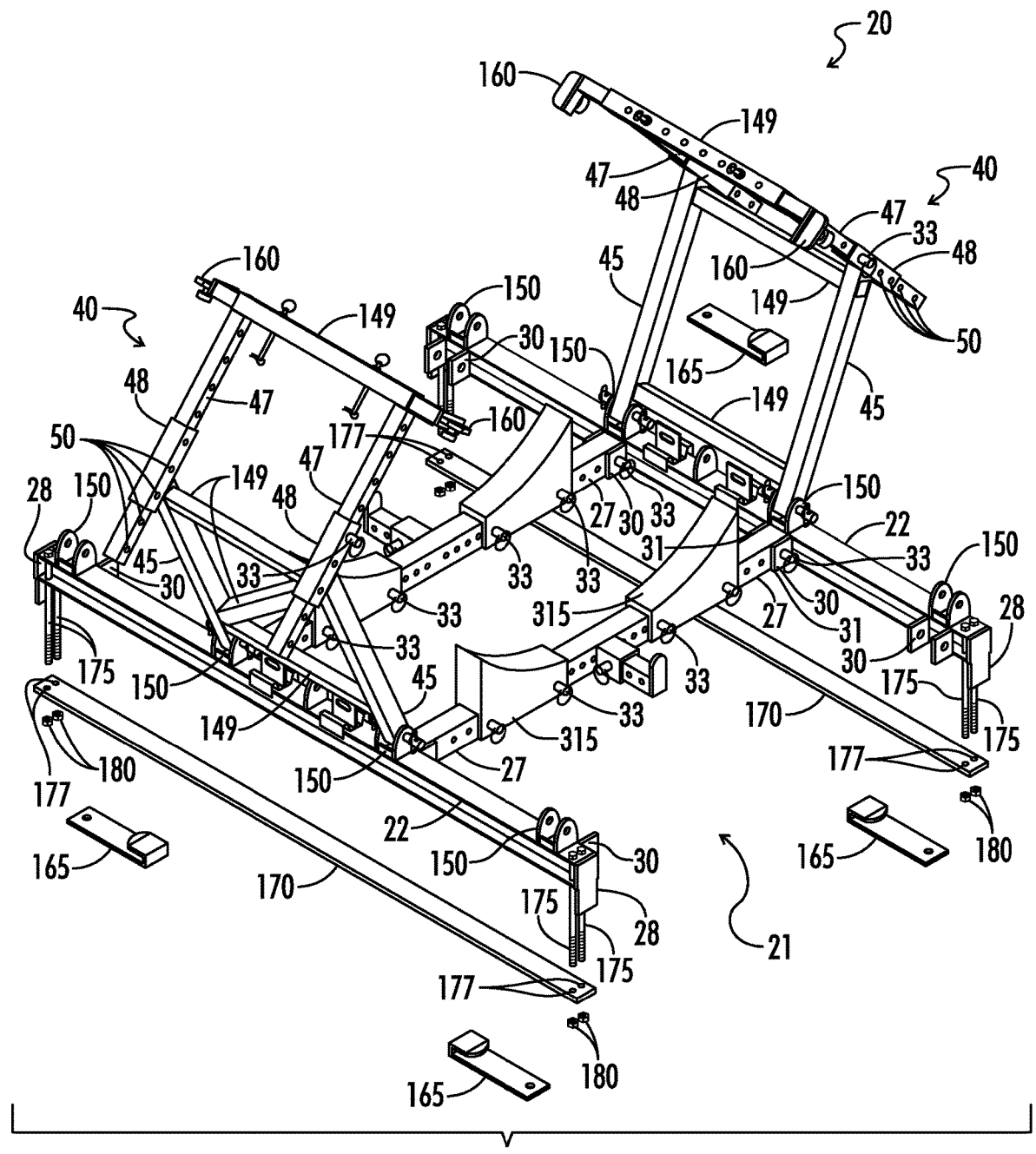
FIG. 2 is a three-dimensional perspective view illustrating an exemplary embodiment of a cargo system.

FIG. 2 depicts an exemplary embodiment of a cargo system 20 that can be mounted on a conventional flatbed carrier 5 for transporting cargo according to the techniques described herein. As shown by FIG. 2, the system 20 comprises a base 21 that detachably couples to the carrier 5 and is capable of supporting cargo for transit on the carrier 5. The base 21 has a plurality of anchoring beams 22 for coupling to a flatbed carrier 5 as described further below. The base 21 also has a plurality of support beams 27 that run between the anchoring beams 22. In the exemplary embodiment shown by FIG. 2, two anchoring beams 22 sit on top of the deck 7 of a flatbed carrier 5, oriented perpendicularly with respect to the side rails 10 the carrier 5 (i.e., crosswise on the carrier 5) as discussed further below. In the instant embodiment, each anchoring beam 22 has a first end and a second end, and each end has at least one generally flat tab 28 that fits between the deck 7 and a side rail 10 (FIG. 3) for securing the anchoring beam 22 to the carrier 5, as described further below. In one embodiment, the anchoring beams 22 are I-beams having an I-shaped cross section, but other shapes of the anchoring beams 22 are possible. In other embodiments, the anchoring beams 22 have a generally uniform square or rectangular cross section.

As further shown by FIG. 2, two adjacent support beams 27 sit on the deck 7 between the anchoring beams 22 and generally parallel to the side rails 10 of the bed of the carrier 5 (i.e., lengthwise). Each support beam 27 has a first end attached to one anchoring beam 22 and a second end attached to another anchoring beam 22. In one embodiment, the support beams 27 have a generally uniform square or rectangular cross section, but other cross sections of the support beams 27 are possible in other embodiments. Note that in the exemplary embodiment shown by FIG. 1, two support beams 27 couple perpendicularly relative to the anchoring beams 22 in a configuration for carrying one steel coil (not shown in FIG. 2) with its eye crosswise on the carrier 5, as described in more detail hereafter. In other embodiments, other shapes of the anchoring beams 22 are possible.

The anchoring beams 22 have a plurality of adjacent support brackets 30 that couple the support beams 27 to the anchoring beams 22. Each support bracket 30 holds an end of a support beam 27. In this regard, each support bracket 30 has at least two opposing plates 31 that contact an end of a support beam 27, and a pin 33 is inserted through the plates 31 and the support beam 27 in order to secure the end of the support beam 27 to the bracket 30 and, hence, the anchoring beam 22 on which the bracket 30 is mounted. By removing the pin 33 from the plates 31 and the support beam 27, the support beam 27 can be removed and coupled detachably to any other support bracket 30. Other techniques for coupling the support beams 27 to the anchoring beams 22 are possible in other embodiments.

Note that each support beam 27 can couple to the anchoring beams 22 via any of the support brackets 30 based on the size and number of coils (not shown in FIG. 1) the system 20 must secure. In this regard, each end of each support beam 27 decouples from its respective support bracket 30, and can couple interchangeably with any other support brackets 30, if desired.

In the exemplary embodiment depicted by FIG. 2, a total of eight evenly-spaced support brackets 30 on the two anchoring beams 22 can couple up to four support beams 27 to the anchoring beams 22. In one embodiment, the ends of two support beams 27 detachably couple to the two anchoring beams 22 using the four inner-most support brackets 30 when the system 20 is arranged to carry one steel coil (not shown in FIG. 2) with its eye facing crosswise on the carrier 5 (i.e., the longitudinal axis of the eye is perpendicular to the side rails 10 of the carrier 5). In this regard, the support beams 27 support the weight of the coil (not shown in FIG. 2) generally over the center of the deck 7 of the flatbed carrier 5, promoting stability during transport. When the system 20 is configured to secure two steel coils (not shown in FIG. 2) sitting side-by-side with eyes facing crosswise, four support beams 27 detachably couple to the two anchoring beams 22 using all eight support brackets 30 of the anchoring beams 22 (i.e., two support beams 27 for each coil). In other embodiments, other configurations of the cargo system 20, including other numbers of support beams 27, anchoring beams 22, and brackets 30 may be used.

As noted above, a plurality of adjustable arms 40 extends upward from the base 21 (e.g., upward from an anchoring beam 22 of the base 21 in front of the coil and an anchoring beam 22 of the base 21 behind it) and applies pressure to an upper portion of each coil (not shown in FIG. 2). In an exemplary embodiment, each arm 40 has two adjacent lower segments 45 and two adjacent upper segments 47. As will be described in more detail below, each lower segment 45 is pivotally coupled to an anchoring beam 22 by a respective arm mount 150, and an opposite end of each lower segment 45 is coupled to hollow sleeve 48 into which a respective one of the upper segments 47 is inserted. In this regard, for each hollow sleeve 48, a respective one of the upper segments 47 slides with respect to the longitudinal axis of the hollow sleeve 48 to adjust the length of the arm 40 in order to accommodate coils (not shown in FIG. 2) of various sizes. Specifically, the length of an arm 40 (from the end that is coupled to the base 21 to the end that contacts the coil) decreases as its upper segment 47 is pushed further into the sleeve 48 such that the arm's cross member 149 moves toward the sleeve 48, and the length of the arm 40 increases as its upper segment 47 is pulled from the sleeve 48 such that the arm's cross member 149 moves away from the sleeve 48.

Note that the hollow sleeves 48 coupled to adjacent lower segments 45 are also adjacent to one another. In one embodiment, the cross-sectional shapes of the upper segments 47 correspond to the cross-sectional shapes of the hollow sleeves 48, though other cross-sectional shapes of the upper segments 47 and hollow sleeves 48 are possible in other embodiments. In this regard, the adjacent upper segments 47 slide within the hollow sleeves 48 to adjust (i.e., lengthen or shorten) the length (i.e., the height) of each arm 40. Other techniques for adjusting the length of each of the plurality of arms 40 based on coil size are possible in other embodiments.

In an exemplary embodiment, a pin 33 secures each upper segment 47 its respective hollow sleeve 48 once the segment 47 has been moved to an appropriate position to achieve a desired arm length. In this regard, each upper segment 47 has a plurality of holes perpendicular to the longitudinal axis of the segment 47. At least one of the plurality of holes 50 on an upper segment 47 aligns with at least one of a plurality of holes 50 on the hollow sleeve 48 into which the upper segment 47 is inserted. For each of the sleeves 48, at least one pin 33 passes through the sleeve 48 into at least one of the plurality of holes 50 in the upper segments 47 that is inserted into the sleeve 48 thereby securing the upper segment 47 to the sleeve 48 and, hence, the lower segment 45 on which the sleeve 48 is coupled. Inserting a pin 33 through the sleeve 48 and upper segment 47 as shown has the effect of locking the length of the arm 40 from a bottom end of the lower segment 45 to a top end of the upper segment 47. When the pin 33 is removed, the upper segment 47 is free to move within the sleeve 48 and can be moved by hand into a new position within the sleeve 48, thereby changing the overall length of the arm 40.

In the instant embodiment, at least one of a plurality of cross members 149 couples a lower segment 45 to its respective adjacent lower segment 45, and at least one of a plurality of cross members 149 couples an upper segment 47 to its respective adjacent upper segment 47. In this regard, the plurality of cross members 149 generally enhances the rigidity and stability of each arm 40 and provides additional support to adjacent lower segments 45 and upper segments 47 by coupling them together. In some embodiments, each of the plurality of cross members 149 is oriented with its longitudinal axis perpendicular to the longitudinal axis of each respective lower segment 45 or upper segment 47.

In yet other embodiments, at least some of the plurality of cross members 149 may be oriented with their longitudinal axis at varying angles relative to each respective lower segment 45 or upper segment 47, while others are oriented with their longitudinal axis oriented perpendicular to the longitudinal axis of each lower segment 45 or upper segment 47. Note that it is not necessary for all of the plurality of cross members 149 to couple with their longitudinal axis at the same angle relative to the longitudinal axis of each respective lower support 45 or upper support 47. In some embodiments, it is unnecessary for the arms 40 to include cross members 149. As an example, in such embodiments in which the arms 40 do not include any of the plurality of cross members 149, each arm 40 may have only one lower segment 45 and one upper segment 47, coupled via a pin 33 passing through at least one of a plurality of holes 50 in the upper segment 47 and a hollow sleeve 48 as described above. In this regard, each upper segment 47 slides within the hollow sleeve 48 to lengthen or shorten the length of the arm 40, according to the techniques described above or otherwise.

Each anchoring beam 22 has at least one arm mount 150 for coupling a respective one of the arms 40 to the anchoring beam 22. In the exemplary embodiment shown by FIG. 2, each anchoring beam 22 has four evenly-spaced adjacent arm mounts 150 fixed to an upper side of the anchoring beam 22. Two adjacent arm mounts 150 couple the respective lower segments 45 of a respective arm 40 to a corresponding anchoring beam 22 (i.e., two adjacent mounts 150 per arm 40). The arm mounts 150 permit the arms 40 to pivot with respect to the arm mounts 150 (i.e., toward or away from a coil) so that the arms 40 can adjust to make contact with an upper portion of a coil (not shown in FIG. 2). A user may pivot the arms 40 about the arm mounts 150 by hand to make contact with a coil (not shown in FIG. 2) if desired. Note that each arm 40 shown by FIG. 2 couples detachably to its respective arm mounts 150 so that it can be removed from one arm mount 150 and then coupled interchangeably with any other arm mounts 150, if desired. In this regard, the arms 40 can couple to the anchoring beams 22 via any adjacent pair of arm mounts 150 based on the size and number of coils a user desires to transport using the system 20.

Tethers (not shown in FIG. 2) extend from tethering tabs 160 to tethering brackets 165 that are mounted on the mainframe 13 (not shown in FIG. 2) of the carrier 5, as discussed below. In an exemplary embodiment, each of the plurality of arms 40 has at least one tethering tab 160 for coupling to a tether (not shown in FIG. 2). In one embodiment, a tether (not shown in FIG. 2) passes through the tethering tab 160 and provides tension to the arm 40 when the tether (not shown in FIG. 2) experiences tension. In this regard, tension in each tether (not shown in FIG. 2) transferred by its corresponding tethering tab 160 to an arm presses the arm 40 against a coil (not shown in FIG. 2) that is loaded into the system 20, as described in further detail hereafter. The force exerted by arm 40 holds the coil in place during transport.

In some embodiments, additional devices may be used to couple the system 20 to a carrier 5. In the exemplary embodiment shown by FIG. 2, each of the anchoring beams 22 of the system 20 has a bracing member 170 that passes through or beneath the mainframe 13 and deck 7 of the carrier 5 roughly parallel to each of the anchoring beams 22. Threaded bolts 175 pass through each end of each of the anchoring beams 22 and holes 177 on ends of each of the bracing members 170. Nuts 180 may be tightened onto each of the threaded bolts 175 to provide sufficient pressure against each bracing member 170 to secure each of the plurality of bracing members 170 to the carrier 5. Note that it is not necessary for the bracing member 170 to pass through or beneath the mainframe 13 and deck 7 of the carrier 5 in other embodiments, and threaded bolts 175 may be used to secure a plurality of bracing members 170 at each respective end of each anchoring beam 22 in other embodiments.

Figure 3:
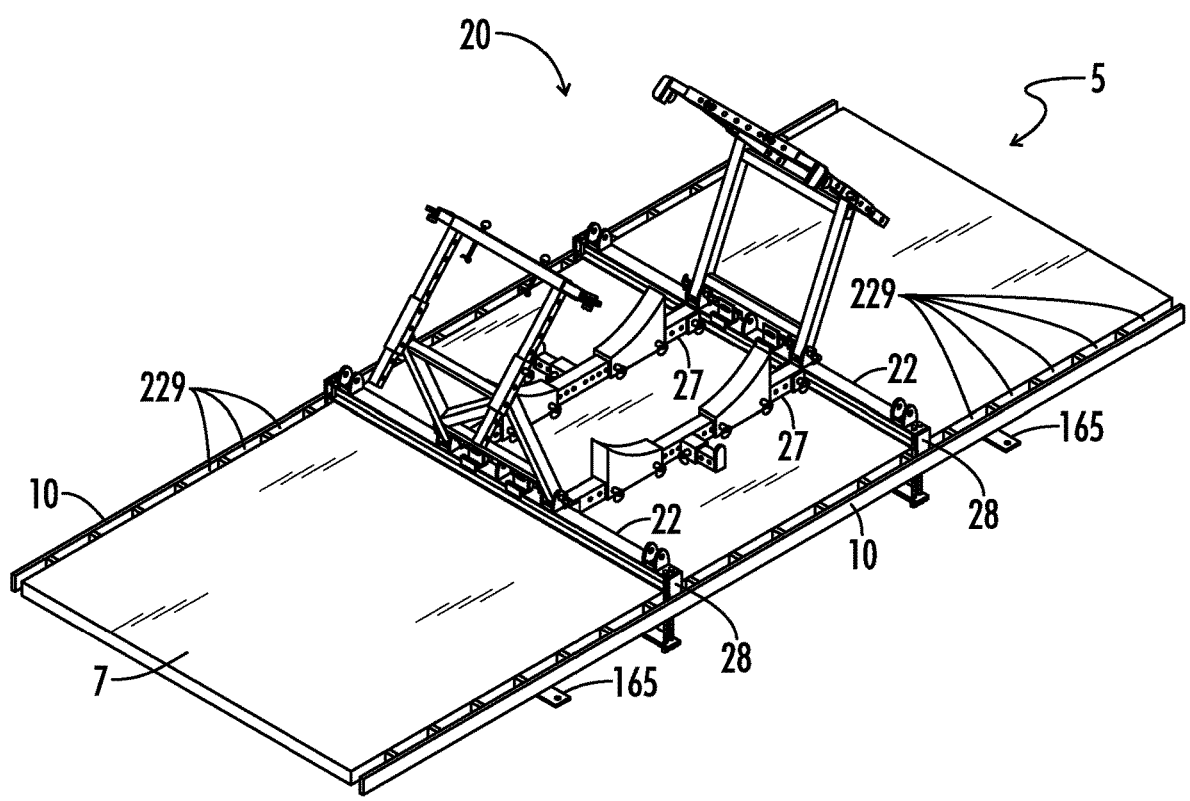
FIG. 3 is a three-dimensional perspective view depicting a cargo system, such as is depicted by FIG. 2, coupled to a flatbed carrier.

FIG. 3 shows a three-dimensional perspective view of the cargo system 20 coupled to a flatbed carrier 5. In the exemplary embodiment of FIG. 3, flat bottom sides of two anchoring beams 22 sit adjacent to the deck 7 of the carrier 5. Flat bottom sides of two support beams 27 also sit on the deck 7 and run between two anchoring beams 22. In one embodiment, each of the generally flat tabs 28 located on the ends of each anchoring beam 22 extends downward and fits into one of a plurality of slots 229 on the flatbed carrier 5.

Note that the plurality of slots 229 is defined by the space between the side rails 10 and the deck 7 of the flatbed carrier 5, and that the plurality of slots 229 generally corresponds to the sizes of the tabs 26. Thus, the plurality of side rails 10 brace the tabs 28 against lateral or horizontal movement with respect to the deck 7 of the carrier 5. In this regard, the tabs 28 help to hold the anchor beams 22 in place on the carrier 5 when inserted into the plurality of slots 229. Note that, in the instant embodiment, the tabs 28 essentially couple the anchoring beams 22 to the carrier 5 by snugly fitting into each of the respective plurality of slots 229 without the necessity of pins 33 or other coupling devices.

In other embodiments, other devices or techniques for holding or otherwise coupling the anchoring beams 22 to the carrier 5 are possible.

Figure 4:
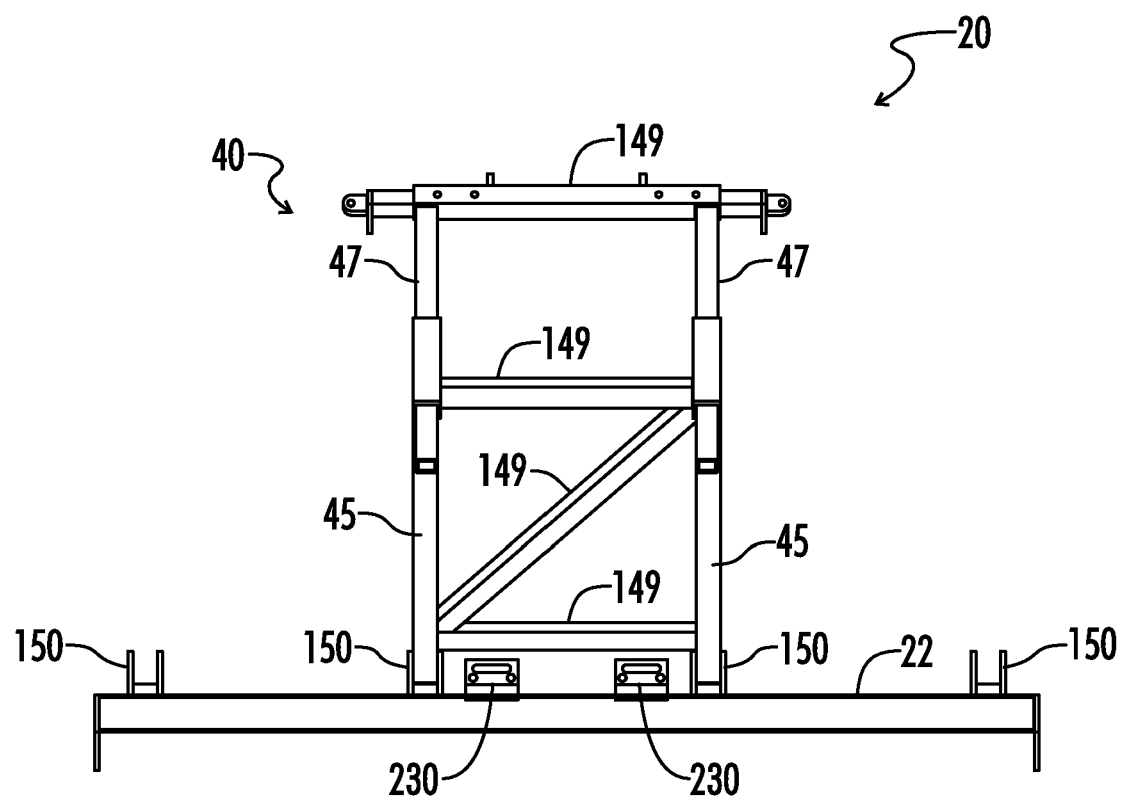
FIG. 4 is a rear view illustrating a cargo system, such as is depicted by FIG. 2.

FIG. 4 shows a rear view of the system 20. Note that the system 20 shown by FIG. 4 is not loaded (i.e., there is no coil shown). In the exemplary embodiment of FIG. 4, a plurality of cross members 149 connects each of the respective upper segments 47 and respective lower segments 45 of the arm 40. In this regard, the cross members 49 of the arm 40 essentially couple each of the upper segments 47 and lower segments 45 of each arm 40 together.

In the exemplary embodiment depicted by FIG. 4, the system 20 is configured to carry one steel coil (not shown in FIG. 4), with the eye of the coil (not shown in FIG. 4) facing crosswise, as described above. An arm 40 is coupled to the two innermost arm mounts 150 on the anchoring beam 22. Note that the arm 40 also can be coupled to any other pair of arm mounts 150 on the anchoring beam 22. Note that when the system 20 is configured to carry two steel coils (not shown in FIG. 4), the coils (not shown in FIG. 4) may sit side-by-side on the carrier 5, such that the eyes of each coil (not shown in FIG. 4) face crosswise. The two lower segments 45 of each arm 40 couple to the left-most arm mounts 150, while the two lower segments 45 of another arm 40 couple to the right-most arm mounts 150. As noted above, the lower segments 45 of each respective arm 40 can couple interchangeably with any other pair of arm mounts 150 coupled to the anchoring beam 22.

The exemplary embodiment of FIG. 4 further shows adjacent tie down brackets 230 fixed to the anchoring beam 22. As noted above, FIG. 4 depicts the system 20 configured to secure one steel coil (not shown in FIG. 4). In this regard, only two tie down brackets 230 are shown, but the system 20 has additional adjacent tie down brackets 230 in other embodiments. A plurality of tethers (such as straps, ropes, rods, chains, cords, or belts) passes, loops through or otherwise couples to each tie down bracket 230 fixed to the top of each anchoring beam 22. The plurality of tethers (not shown) passes over the top of the coil (not shown in FIG. 4) and passes, loops through or otherwise couples to a corresponding tie down bracket 230 on another side of the coil (not shown in FIG. 4). Note that, in some embodiments, each of the plurality of tethers (not shown) may be adjusted to create sufficient tension in the tether (not shown), such that it holds the coil (not shown in FIG. 4) securely to carrier 5.

Figure 5:
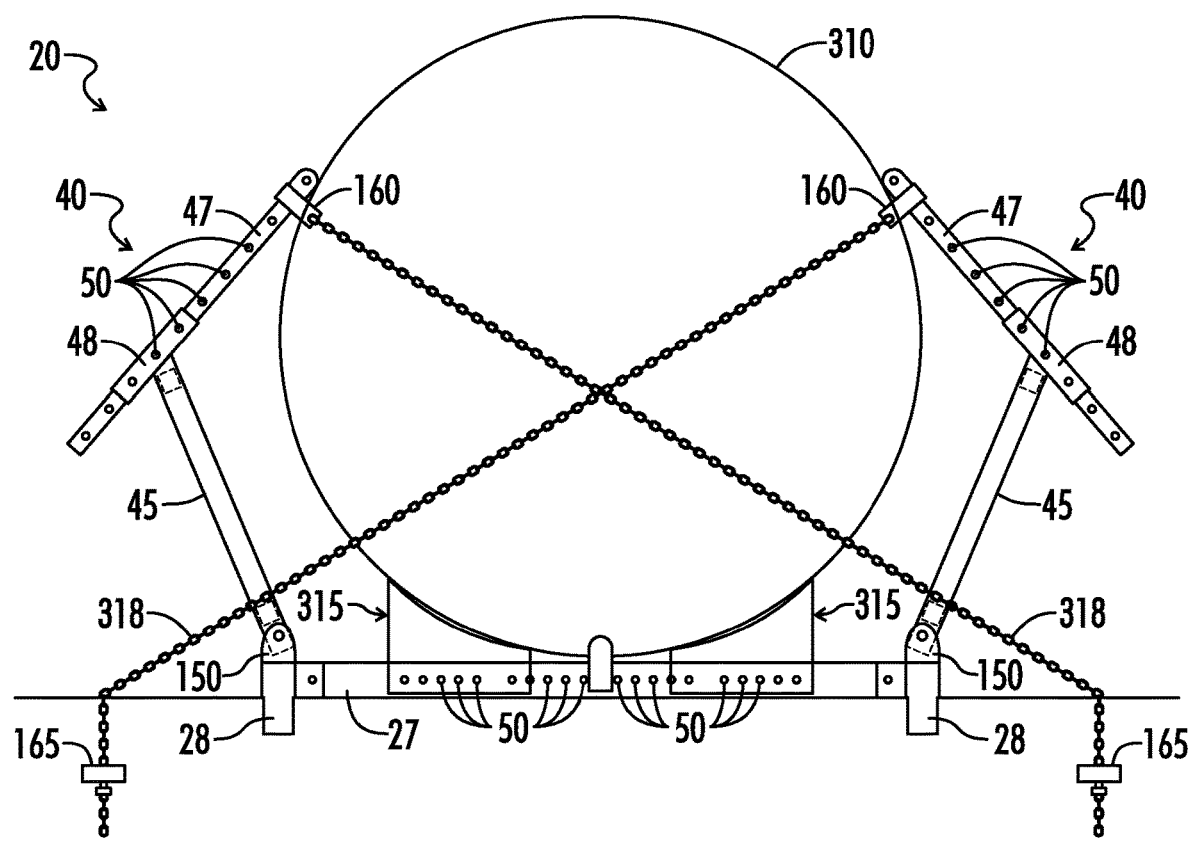
FIG. 5 is a side view illustrating a cargo system, such as is depicted by FIG. 2.

FIG. 5 shows a side view of the system 20. A coil 310 sits on a plurality of cargo supports 315 coupled to a support beam 27. In the exemplary embodiment shown by FIG. 5, two cargo supports 315 sit on the same support beam 27 in opposing orientations. Note that each cargo support 315 has at least one top surface that makes contact with a coil 310 sitting on the cargo support. In one embodiment, the shape of the top surface of each cargo support 315 that makes contact with the coil 310 generally corresponds to the shape of the coil 310, although other shapes, types and numbers of cargo supports 315 are possible in other embodiments. As an example, the top surface may have a substantially similar radius of curvature as the coil 310 such that the outer surface of the coil 310 is flush with the top surface of the cargo support 315. Note that two support beams 27 coupled to adjacent support brackets 30, as depicted by FIG. 2 above, can support one coil 310 situated with its eye crosswise for transport. That is, four cargo supports 315 coupled to two adjacent support beams 27 support the coil 310 by forming a cradle that will generally brace the coil 310 against movement. Similarly, four support beams 27 and their associated cargo supports 315 can support two coils 310.

In an exemplary embodiment, cargo supports 315 are detachably coupled to the support beams 27 so that the cargo supports 315 can be moved with respect to the support beams 27 and spaced at a distance corresponding to the size of the coil 310 to provide support. As noted above, each of the cargo supports 315 fits over its respective support beam 27 and slides with respect to the support beam 27 to accommodate coils 310 of various sizes. Once the cargo support 315 is positioned as may be desired, it is secured to its support element 27 so that it can support a coil 310 that is positioned on the cargo support 315. In one embodiment, at least one of a plurality of holes 50 on each of the cargo supports 315 aligns with at least one of a plurality of holes 50 on each of the support beams 27. When the respective holes 50 of a cargo support 315 are aligned with the holes 50 of the support beam 27, at least one pin 33 (not shown in FIG. 5) may be inserted through at least one of the aligned holes 50, thereby securing the cargo support 315 to its respective support beam 27. By removing the pin 33 from the support beam 27 and the cargo support 315, the cargo support 315 is free to move with respect to the support beam 27 and can be slid by hand or otherwise to a new position on the support beam 27. Each cargo support 315 can be detachably coupled to its respective support beam 27 by other techniques in other embodiments.

In the exemplary embodiment shown by FIG. 5, two arms 40 extend upward from the anchoring beams 22 to brace the coil 310 from a front side of the coil 310 and a rear side of the coil 310, respectively. As noted above, the arms 40 can be pivoted and adjusted to accommodate the size of the coil 310. In FIG. 5, upper segments 47 of two arms 40 extend from their respective hollow sleeves 48 and contact an upper portion of the coil 310 to secure it, as described further below.

As further shown by FIG. 5, a plurality of tethers 318 provides tension to each of the arms 40. In an exemplary embodiment, at least one tether 318 provides sufficient tension to causes its respective arm 40 to press against the coil 310 with sufficient pressure to secure it, as described further below. In the embodiment depicted by FIG. 5, the tethers 318 are conventional steel chains, but other types of tethers 318 are possible in other embodiments. In some embodiments, at least one tether 318 is flexible or elastic in nature and may be adjusted to an appropriate length using conventional techniques or otherwise to provide a desired force against the coil for holding it in place. In other embodiments, at least one tether 318 is a rigid tether 318 and that may be adjusted to an appropriate length, such as a telescoped rod.

In an exemplary embodiment, each of the tethers 318 is under sufficient tension to direct pressure against the upper surface of the coil 310 from each arm 40 to secure the coil 310 during transit. In this regard, the tension of each tether 318 may be adjusted as desired using conventional techniques. Note that tethering tabs 160 on distal ends of each on arm 40 couple each tether 318 to each arm 40. Each tether 318 couples to a tethering bracket 165 on the frame of the carrier 25, according to conventional techniques (for example, via a shackle or carabiner). As shown by FIG. 5, the upper ends of arms 40 are forced against the coil 310 at a point above the center of mass of the coil 310. In other embodiments, it is unnecessary to use tethers 318 to direct pressure against an upper portion of a coil 310 from each arm 40, and other techniques are possible to ensure that the arms 40 apply sufficient pressure against an upper portion of a coil 310 to secure it during transit. As an example, each of the arms 40 may be pivoted by a motor in order to press the upper end of the arm 40 against an upper surface of the coil 310.

Figure 6:
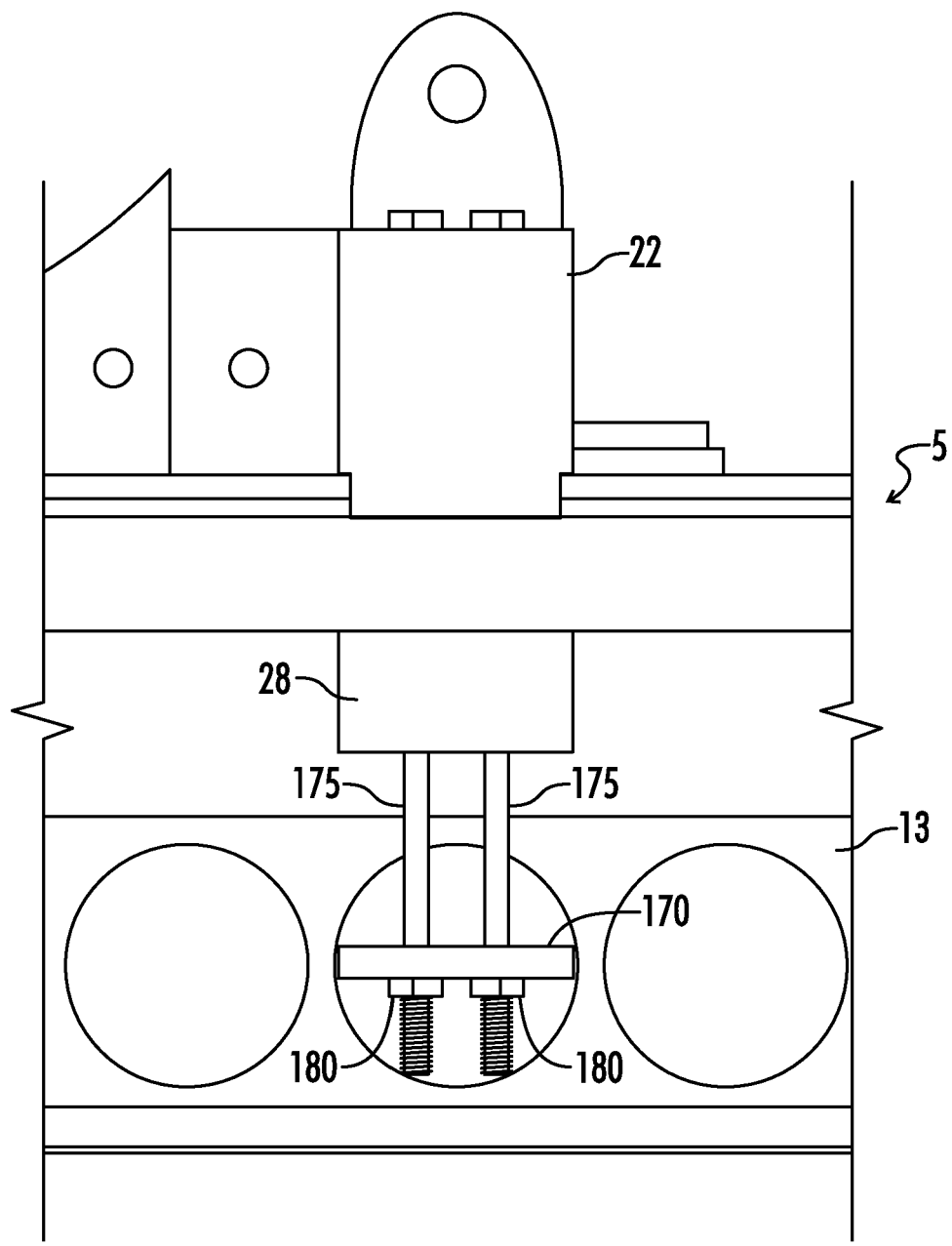
FIG. 6 is a side view illustrating an anchoring tab of a cargo system inserted into a slot of a flatbed carrier.

FIG. 6 shows a side view of an anchoring tab 28 inserted into a slot 229 of a flatbed carrier 5. As described above, the tab 28 is fitted into one of the plurality of slots 229 between a side rail 10 and the deck 7 of the carrier 5. Note that the tab 28 extends below a bottom end of the side rail 10 to provide additional lateral and horizontal support. Nuts 180 are threaded onto the threaded bolts 175 and tightened against the bracing member 170 such that the nuts 180 and threaded bolts 175 hold the bracing member 170 against the mainframe 13 of the carrier 5 and the anchoring beam 22 against the deck 7 of the carrier 5. Note that, in other embodiments, any combination of nuts 180 and bolts 175 can be used to secure a bracing member 170 and anchoring member 22 to the carrier 5. In some embodiments, other devices such as a clamp or vise may be used to secure each anchoring beam 22 to the carrier 5.

Figure 7:
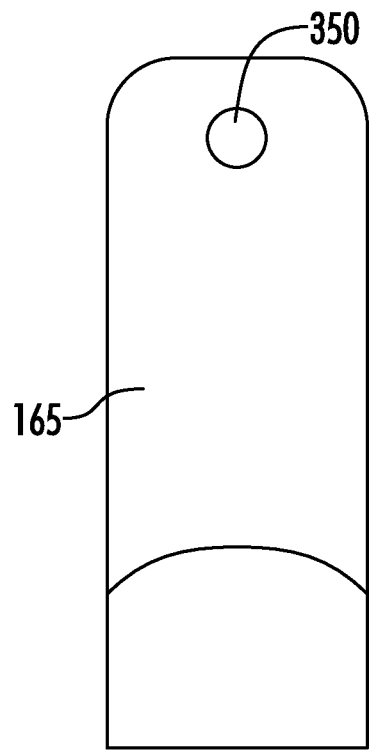
FIG. 7 is a top view illustrating a tether anchoring bracket.

FIG. 7 shows a top view of a tethering bracket 165. The tethering bracket 165 is generally flat with a hooked end, has a generally uniform thickness, and has a generally rectangular shape when viewed from the above, although other shapes are possible. In one embodiment, the bracket 165 has rounded corners on an upper end of the bracket 165 opposite the hooked end. A hole 350 provides a location for receiving or coupling to a tether 318. In an exemplary embodiment, a tether 318 passes through the hole 350 in order to loop through or otherwise couple to the tethering bracket 165. In other embodiments, for example, when using a shackle or carabiner to attach the tether 318 to the tethering bracket 165, the tether 318 may couple to the tethering bracket 165 independently of the hole 350, or may pass through or otherwise couple to the hole 350 via other coupling devices.

Figure 8:
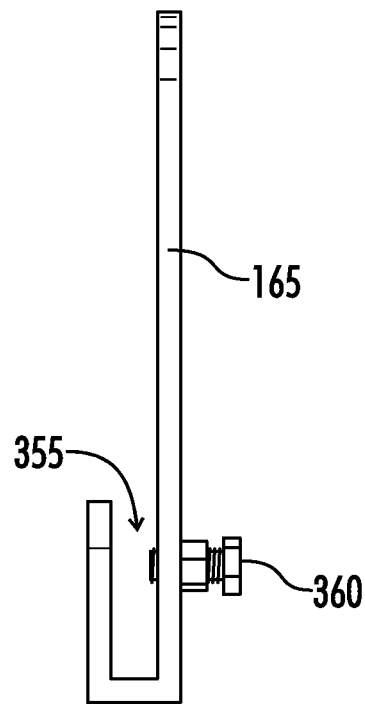
FIG. 8 is a front view of a tether anchoring bracket.

FIG. 8 shows a rear view of a tethering bracket 165. In an exemplary embodiment, a slot 355 on the hooked end of the anchoring bracket 165 opposite the end where the hole 350 is located fits over a portion of the mainframe 13 of the flatbed carrier 5. In this regard, the tethering bracket 165 braces against the mainframe 13 of the carrier 5 when the tether 318 is under tension. A bolt 360 located on the tethering bracket 165 tightens to generate sufficient pressure between the tethering bracket 165 and the mainframe 13 of the carrier 5 to couple the anchoring bracket 165 securely to the mainframe 13 when the slot 355 is fitted over a portion of the mainframe 13. In other embodiments the tethering bracket 165 may be coupled to the mainframe 13 of the carrier 5 via other means.

Figure 9:
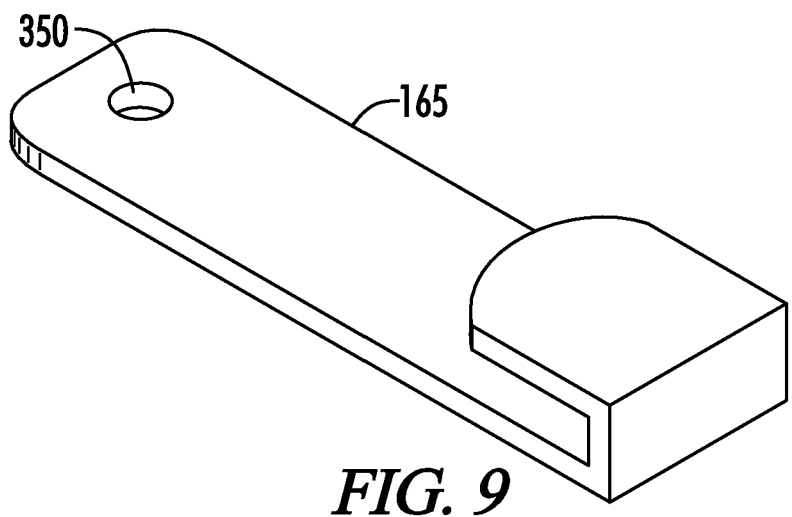
FIG. 9 is a three-dimensional perspective view of a tether anchoring bracket.

FIG. 9 shows a three-dimensional perspective view of a tethering bracket 165. Note that in the instant embodiment, the tethering bracket 165 fits over a portion of the mainframe 13 of a carrier 5 having a thickness roughly corresponding to the thickness of the slot 355. In other embodiments, the bracket 165 may adjust to accommodate a mainframe 13 or other component of a carrier 5 having varying thicknesses, or inconsistent thicknesses. In yet other embodiments, the bracket 165 may be reinforced via increased thickness in areas of the bracket 165 experiencing high levels of stress or strain during loading.

Now, therefore, the folling is claimed:
1. A system for transporting a coil, comprising:
   a flatbed carrier;
   a plurality of anchoring beams mounted on the flatbed carrier;
   a plurality of support beams coupled to the anchoring beams;

a plurality of cargo supports coupled to the support beams, wherein the coil is situated on the cargo supports;

a plurality of arms extending from the anchoring beams and pressed against the coil for securing the coil to the flatbed carrier, the plurality of arms including a first arm pressed against a first side of the coil, a second arm pressed against the first side of the coil, a third arm pressed against a second side of the coil, and a fourth arm pressed against the second side of the coil, wherein a first cross member couples the first arm to the second arm, and wherein a second cross member couples the third arm to the fourth arm; and a plurality of tethers coupled to the arms for holding each of the arms against an outer surface of the coil, the plurality of tethers including a first tether, a second tether, a third tether, and a fourth tether, wherein the first tether couples the first arm to a first bracket mounted on the flatbed carrier, wherein the second tether couples the second arm to a second bracket mounted on the flatbed carrier, wherein the third tether couples the third arm to a third bracket mounted on the flatbed carrier, and wherein the fourth tether couples the fourth arm to a fourth bracket mounted on the flatbed carrier.

2. The system of claim 1, wherein the plurality of anchoring beams comprises a plurality of support brackets for holding the support beams.

3. The system of claim 2, wherein a pin couples one of the support beams to one of the support brackets.

4. The system of claim 1, wherein at least one of the arms comprises a first segment and a second segment that is movable relative to the first segment for adjusting a length of the at least one arm in order to accommodate a size of the coil.

5. The system of claim 1, wherein the first bracket is mounted on an underside of the flatbed carrier.

6. The system of claim 1, wherein the first tether comprises a chain.

7. The system of claim 1, wherein the plurality of anchoring beams include at least a first anchoring beam and a second anchoring beam, wherein the plurality of support beams include at least a first support beam and a second support beam, wherein the plurality of cargo supports comprise at least a first cargo support through which the first support beam passes and a second cargo support through which the second support beam passes, wherein the first cargo support is slidable along the first support beam, and wherein the second cargo support is slidable along the first support beam.

8. The system of claim 1, wherein the first cargo support is secured to the first support beam by a pin passing through the first cargo support and the first support beam, and wherein the second cargo support is secured to the second support beam by a pin passing through the second cargo support and the second support beam.

\* \* \* \* \*